(12) United States Patent
Kim et al.

(10) Patent No.: US 12,603,994 B2
(45) Date of Patent: *Apr. 14, 2026

(54) VIDEO ENCODING AND DECODING USING INTRA BLOCK COPY

(71) Applicant: SK TELECOM CO., LTD., Seoul (KR)

(72) Inventors: Jae Il Kim, Seoul (KR); Sun Young Lee, Seoul (KR); Kyung Hwan Ko, Seoul (KR); Jae Seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 18/650,490

(22) Filed: Apr. 30, 2024

(65) Prior Publication Data

US 2024/0283918 A1 Aug. 22, 2024

Related U.S. Application Data

(63) Continuation of application No. 17/439,361, filed as application No. PCT/KR2020/003572 on Mar. 16, 2020, now Pat. No. 11,997,255.

(30) Foreign Application Priority Data

| | | |
|---|---|---|
| Mar. 14, 2019 | (KR) | 10-2019-0029557 |
| Jan. 28, 2020 | (KR) | 10-2020-0009734 |

(51) Int. Cl.
*H01L 29/94* (2006.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/96* (2014.11)

(58) Field of Classification Search
CPC .. H04N 19/105; H04N 19/159; H04N 19/176; H04N 19/96; H04N 19/11; H04N 19/593; H04N 19/70
See application file for complete search history.

(56) References Cited

U.S. PATENT DOCUMENTS

| | | | | |
|---|---|---|---|---|
| 2003/0108099 A1* | 6/2003 | Nagumo | ................... | G06T 9/20 |
| | | | | 375/E7.199 |
| 2005/0053294 A1* | 3/2005 | Mukerjee | ............... | H04N 19/51 |
| | | | | 375/E7.125 |

(Continued)

FOREIGN PATENT DOCUMENTS

| | | |
|---|---|---|
| CN | 105765974 A | 7/2016 |
| CN | 106464896 A | 2/2017 |

(Continued)

OTHER PUBLICATIONS

International Search Report issued on Jun. 23, 2020 for corresponding international application No. PCT/KR2020/003572, 7 pages.

(Continued)

*Primary Examiner* — Joseph Suh
(74) *Attorney, Agent, or Firm* — Hauptman Ham, LLP

(57) ABSTRACT

A video decoding method for predicting a picture, which is split into equal-sized coding tree blocks, in units of blocks, the method includes: reconstructing a block vector for a current coding block in a current coding tree block to be decoded, by decoding block vector information from a bitstream, wherein the current coding block is one of blocks split from the current coding tree block in a tree structure; and setting, as a prediction block of the current coding block, a reference block indicated by the block vector in the picture in which the current coding block is located.

15 Claims, 16 Drawing Sheets

(51) Int. Cl.
    *H04N 19/159*     (2014.01)
    *H04N 19/176*     (2014.01)
    *H04N 19/96*     (2014.01)

(56)             References Cited

U.S. PATENT DOCUMENTS

| | | | |
|---|---|---|---|
| 2006/0126962 | A1* | 6/2006 | Sun ........................ H04N 19/895 |
| | | | 382/268 |
| 2014/0376634 | A1* | 12/2014 | Guo ........................ H04N 19/523 |
| | | | 375/240.16 |
| 2015/0373357 | A1 | 12/2015 | Pang et al. |
| 2015/0373358 | A1 | 12/2015 | Pang et al. |
| 2016/0241868 | A1* | 8/2016 | Li ............................ H04N 19/82 |
| 2016/0330455 | A1 | 11/2016 | Lin et al. |
| 2016/0337661 | A1* | 11/2016 | Pang .................... H04N 19/593 |
| 2017/0094271 | A1 | 3/2017 | Liu et al. |
| 2017/0134724 | A1 | 5/2017 | Liu et al. |
| 2017/0223379 | A1* | 8/2017 | Chuang ................ H04N 19/513 |
| 2019/0246128 | A1* | 8/2019 | Xu ......................... H04N 19/11 |
| 2019/0281303 | A1* | 9/2019 | Xu ......................... H04N 19/44 |

FOREIGN PATENT DOCUMENTS

| | | | |
|---|---|---|---|
| CN | 109076210 | A | 12/2018 |
| JP | 2016-532377 | A | 10/2016 |
| KR | 10-2016-0072181 | A | 6/2016 |
| KR | 10-2017-0019365 | A | 2/2017 |
| KR | 10-2017-0029549 | A | 3/2017 |
| WO | 2015/035449 | A1 | 3/2015 |
| WO | 2016/004850 | A1 | 1/2016 |
| WO | 2017/206803 | A1 | 12/2017 |

OTHER PUBLICATIONS

Written Opinion issued for corresponding International Patent Application No. PCT/2020/003572 on Jun. 23, 2020, 5 pages.
Chinese Office Action dated Jul. 1, 2023 for corresponding Chinese Patent Application No. 202080035498.9, 16 pages.

* cited by examiner

0 : Planar
1 : DC

Bitstream → Decoder (410) → Inverse quantizer (420) → Inverse transformer (430) → + (450) → Reconstructed image Inter-predictor (440) (444)
Intra-predictor (442)

Memory (470) ← SAO (464) (460) ← Deblocking filter (462)

(A)

(B)

(C)

(D)

(A)

(B)

(C)

(D)

(A)

(B)

(C)

(D)

(A)

(B)

(C)

(D)

(A)

(B)

(C)

(D)

(A) LOCATED ADJACENT TO X-AXIS BOUNDARY (B) LOCATED ADJACENT TO Y-AXIS BOUNDARY

VIDEO ENCODING AND DECODING USING INTRA BLOCK COPY

CROSS-REFERENCE TO RELATED APPLICATION

The present application is a Continuation of U.S. patent application Ser. No. 17/439,361, filed on Sep. 14, 2021, which is a National Phase of PCT/KR2020/003572, filed on Mar. 16, 2020, which is based on and claims priority to Korean Patent Application No. 10-2019-0029557, filed on Mar. 14, 2019, and Korean Patent Application No. 10-2020-0009734, filed on Jan. 28, 2020. All of the aforementioned applications are incorporated herein by reference in their entireties.

TECHNICAL FIELD

The present disclosure relates to encoding and decoding a video by performing video prediction in units of blocks using an intra block copy (IBC) mode.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/ AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

The present disclosure relates to improved video encoding and decoding and proposes a technique for predicting a video in units of blocks using an intra block copy mode.

Technical Solution

According to at least one aspect, the present disclosure provides a video decoding method of predicting a picture, which is split into equal-sized coding tree blocks, in units of blocks. The method includes: reconstructing a block vector for a current coding block in a current coding tree block to be decoded, by decoding block vector information from a bitstream, wherein the current coding block is one of blocks split from the current coding tree block in a tree structure; and setting, as a prediction block of the current coding block, a reference block indicated by the block vector in the picture in which the current coding block is located. Herein, the value of the block vector is limited to prevent the reference block from being located outside a search area that is set in at least one of the current coding tree block and a left coding tree block of the current coding tree block, and the search area is selected from pre-decoded processing regions among a plurality of processing regions which are split in an equal size from each of the current coding tree block and the left coding tree block.

According to another aspect, the present disclosure provides a video encoding method of predicting a picture, which is split into equal-sized coding tree blocks, in units of blocks. The method includes: determining a block vector of a current coding block of a current coding tree block to be encoded, wherein the current coding block is one of blocks split in a tree structure from the current coding tree block; setting, as a prediction block of the current coding block, a reference block indicated by the block vector in the picture in which the current coding block is located; and encoding information about the block vector. Herein, a value of the block vector is limited to prevent the reference block from being located outside a search area that is set in at least one of the current coding tree block and a left coding tree block of the current coding tree block, and the search area is selected from among pre-encoded processing regions among a plurality of processing regions which are split in an equal size from each of the current coding tree block and the left coding tree block.

According to another aspect, the present disclosure provides a video decoding apparatus for predicting a current coding block to be decoded in a picture split into equal-sized coding tree blocks. The apparatus includes: a decoder configured to split a current coding tree block by a tree structure so as to determine the current coding block to be decoded, and decode block vector information from a bitstream; and a predictor configured to calculate a block vector for the current coding block using the block vector information, and set a reference block, which is indicated by the block vector in the picture including the current coding block, as a prediction block of the current coding block. Herein, a value of the block vector is limited to prevent the reference block from being located outside a search area that is set in at least one of the current coding tree block and a left coding tree block of the current coding tree block, and the search area is selected from pre-decoded processing regions among a plurality of processing regions which are split in an equal size from each of the current coding tree block and the left coding tree block.

Advantageous Effects

An intra block copy (IBC) mode proposed in the present disclosure is a useful tool for improving compression performance when a pattern is repeated in a picture. Particularly, the present disclosure provides a useful method of defining and managing a search range (SR) to find a reference block within a picture that is the same as a block to be encoded.

DETAILED DESCRIPTION

Figure 1:
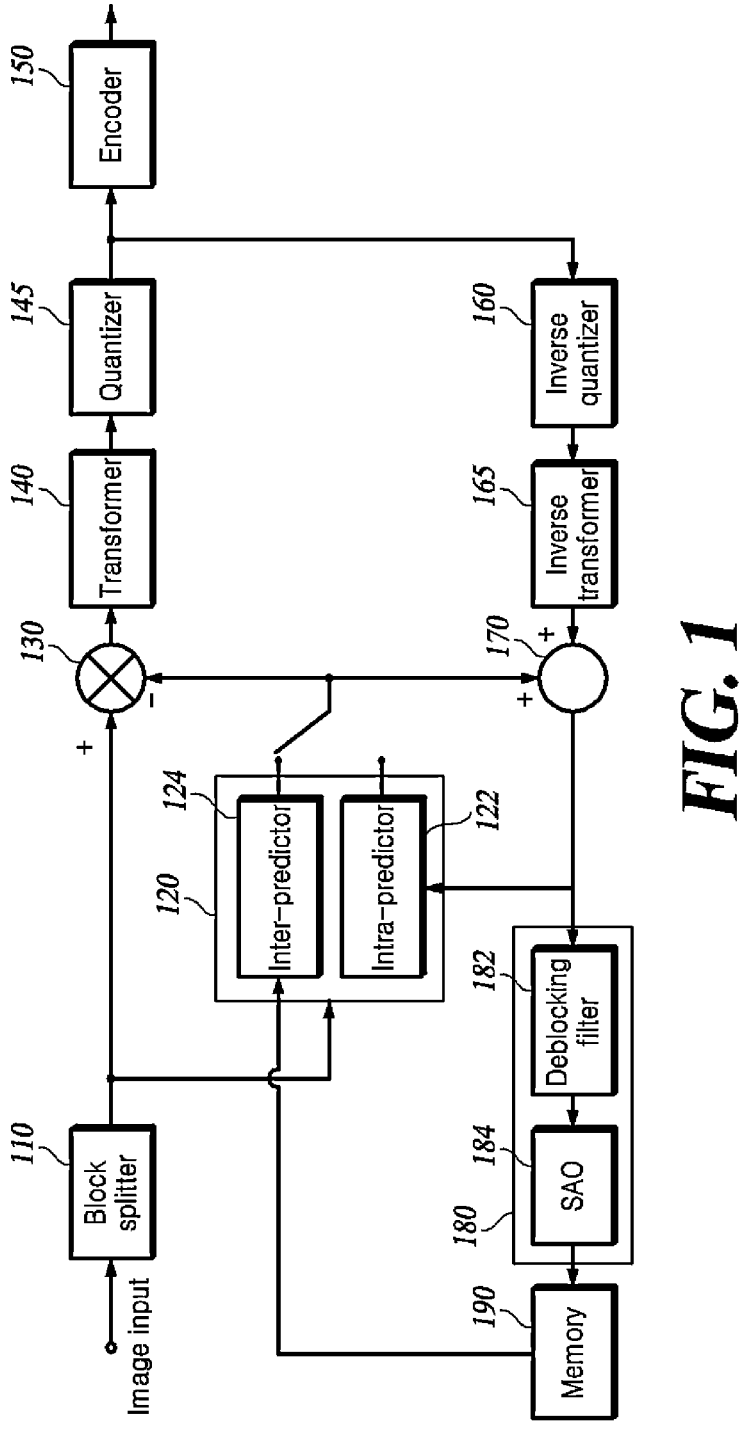
FIG. 1 is a block diagram of an example of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group or may be identical to the slice. Each tile or slice is split into one or more equal-sized coding tree units (CTUs). In other words, one picture may be split into equal-sized CTUs, and one or more CTUs may constitute a tile or a slice. Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group or a slice, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
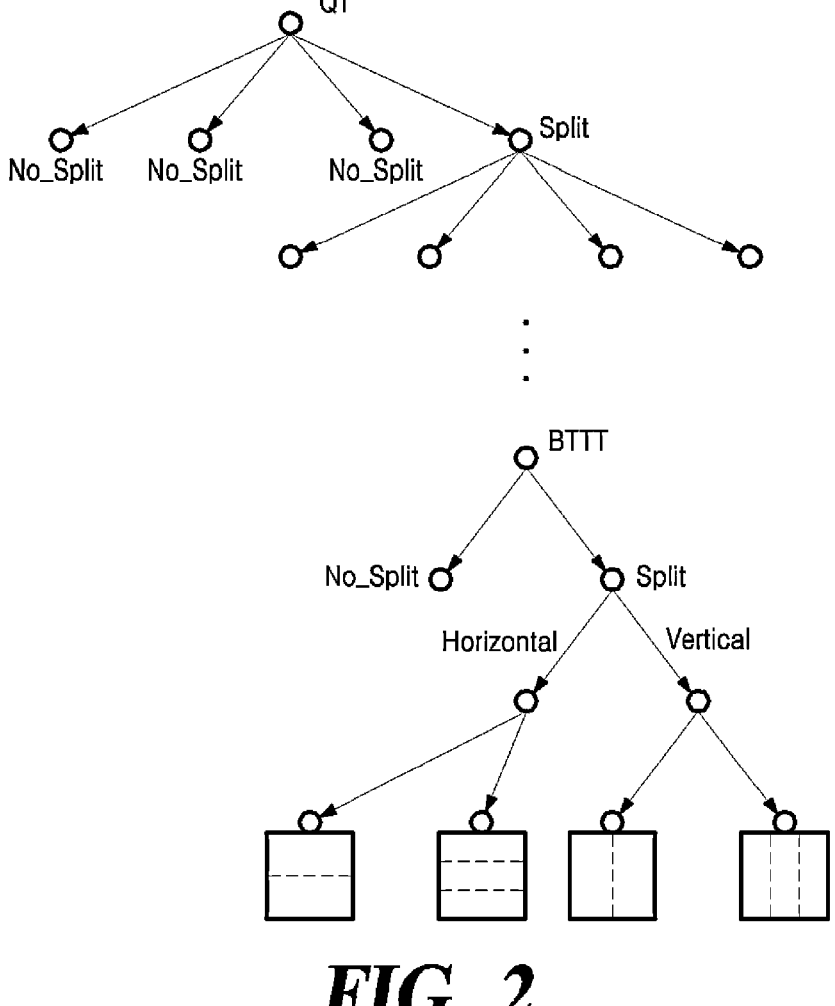
FIG. 2 is a diagram for describing a QTBTTT split tree structure.

FIG. 2 shows a QTBTTT splitting tree structure. As shown in FIG. 2, a CTU may be initially split in the QT structure. The QT splitting may be repeated until the size of the splitting block reaches the minimum block size (MinQT-Size) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded may be referred to as a 'current block' or 'current coding block.' The CTU may be referred to as a coding tree unit or coding tree block.

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figures 3, 4:
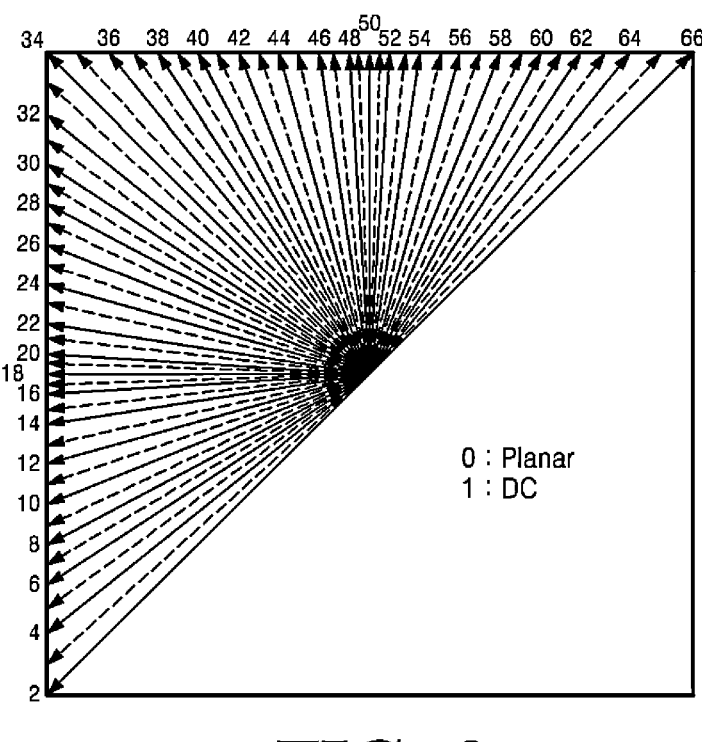
FIG. 3 is a diagram for describing a plurality of intra prediction modes.
FIG. 4 is a block diagram of an example of a video decoding apparatus capable of implementing the techniques of the present disclosure.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or motion information (information about a reference picture and a motion vector) according to the prediction type.

Various methods may be used to reduce or minimize the amount of bits needed to encode the motion information. Representative examples of the various methods include a skip mode, a merge mode, and an adaptive (advanced) motion vector predicator (AMVP) mode.

The skip mode and the merge mode are different in that information about residual signals is not encoded (i.e., all the residual signals are set to 0) in the skip mode and is encoded in the merge mode. However, motion information is encoded in the same way in the skip mode and the merge mode. First, a predetermined number of candidate blocks are selected from among neighboring blocks. When the candidate blocks are selected, the inter predictor 124 configures a merge list including the candidate blocks, selects motion information to be used as motion information of a current block from among motion information of the candidate blocks included in the merge list, and generates a merge index value for identification of the selected motion information (a selected candidate block). The merge index value is encoded and signaled to the video decoding apparatus.

In the AMVP mode, first, motion vector predictor (MVP) candidates are derived with respect to a motion vector of the current block using neighboring blocks of the current block. The inter predictor 124 selects an MVP for the motion vector of the current block from among the MVP candidates and calculates a motion vector difference (MVD) by subtracting the selected MVP from the motion vector of the current block. Identification information (an MVP index) indicating a candidate selected as the MVP from among the MVP candidates, and the MVD are encoded and signaled to the video decoding apparatus.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the motion information, that is, information on a motion vector and information on a reference picture referred to by the motion vector. In the case that motion information is encoded in the skip mode or merge mode, the decoder 410 extracts merge index. In the case that motion information is encoded in the AMVP mode, the decoder 410 extracts a motion vector difference (MVD), index for identifying a motion vector predictor (MVP), and reference picture information.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter predictor 444 determines a motion vector of the current block and a reference picture referenced by the motion vector by using the syntax elements related to the motion information, which are extracted by the decoder 410, and predicts the current block using the motion vector and the reference picture. That is, in the skip mode or the merge mode, a motion vector corresponding to a candidate block indicated by the merge index among merge candidates derived from neighboring blocks is set as the motion vector of the current block. In contrast, in the AMVP mode, the motion vector of the current block is calculated by adding the motion vector difference (MVD) to a motion vector (MVP) which is indicated by an MVP index among MVP candidates derived from neighboring blocks.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

In the present disclosure, a current picture referencing (CRP) mode is proposed as another method of predicting a current block (a current coding block) to be encoded or decoded. The CRP mode may be referred to as an intra block copy (IBC) mode.

Figure 5:
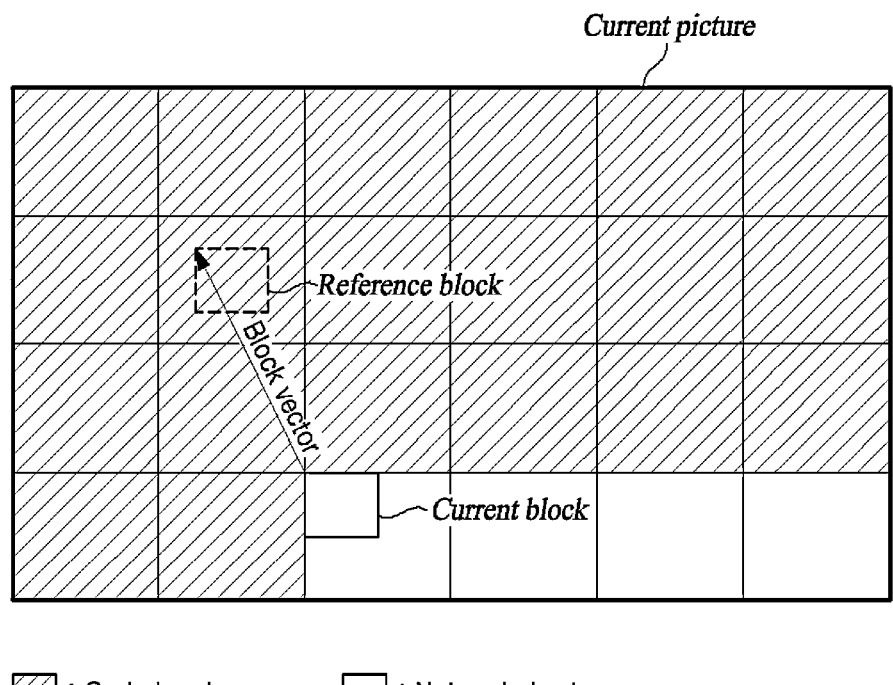
FIG. 5 is a diagram for describing an intra block copy (IBC) mode.

FIG. 5 is a diagram for describing the IBC mode.

Among blocks included in a current picture of FIG. 5, hatched-blocks represent blocks or regions that have already been encode or decoded (coded region), and non-hatched blocks represent blocks or regions that has not yet been encoded or decoded (not coded yet). A reference block from which prediction information of a current block is obtained corresponds to a block that has been already decoded in the current picture. The reference block is indicated by a motion vector (MV), and in the IBC mode, the motion vector may be referred to as a block vector (BV). Information about whether the IBC mode is applied and information about the block vector are signaled from the video encoding apparatus to the video decoding apparatus. The video decoding apparatus may check whether the current coding block has been encoded in the IBC mode, on the basis of the signaled information, and decode the information about the block vector when the current coding block has been encoded in the IBC mode to generate a prediction block in the same manner used in the video encoding apparatus.

The IBC mode is similar to the intra prediction mode in that reference samples included in the current picture are used. However, the IBC mode is similar to inter prediction in that a block at a position indicated by a motion vector in an encoded/decoded region of a current picture is generated as a prediction block without using encoded/decoded reference samples adjacent to a current coding block.

Inter prediction may be classified into the skip mode, the merge mode or the AMVP mode as described above. Similarly, in the IBC mode, information about a block vector may be signaled in one of the skip mode, the merge mode, or the AMVP mode. Hereinafter, for convenience of description, the skip mode, the merge mode, and the AMVP mode in general inter prediction will be described as inter_skip, inter_merge, and inter_amvp, respectively, and the skip mode, while the merge mode, and the AMVP mode in the IBC mode will be described as ibc_skip, ibc_merge, and ibc_amvp, respectively.

As an exemplary method of signaling information about the IBC mode, a flag ibc_flag indicating whether a current mode is the IBC mode may be signaled in addition to syntax information identifying inter_skip, inter_merge, or inter_amvp, so as to denote ibc_skip, ibc_merge, or ibc_amvp.

As another example, in the case of an ibc_skip mode and/or an ibc_merge mode, an additional flag representing the IBC mode may not be transmitted and the IBC mode may be identified according to whether a candidate indicated by a merge index among multiple merge candidates has been encoded in the IBC mode or a general inter mode. In the ibc_amvp mode, the flag ibc_flag is transmitted to distinguish between the general inter mode and the IBC mode.

According to the present disclosure, in the ibc_skip mode and/or the ibc_merge mode, a merge index value merge_idx may be additionally transmitted to derive motion information, and in the ibc_amvp mode, a block vector difference (BVD) and block vector predictor (BVP) information may be additionally transmitted to derive motion information. In the IBC mode, the current picture is used as a reference picture, and thus information about the reference picture is not transmitted separately.

Figure 6A:
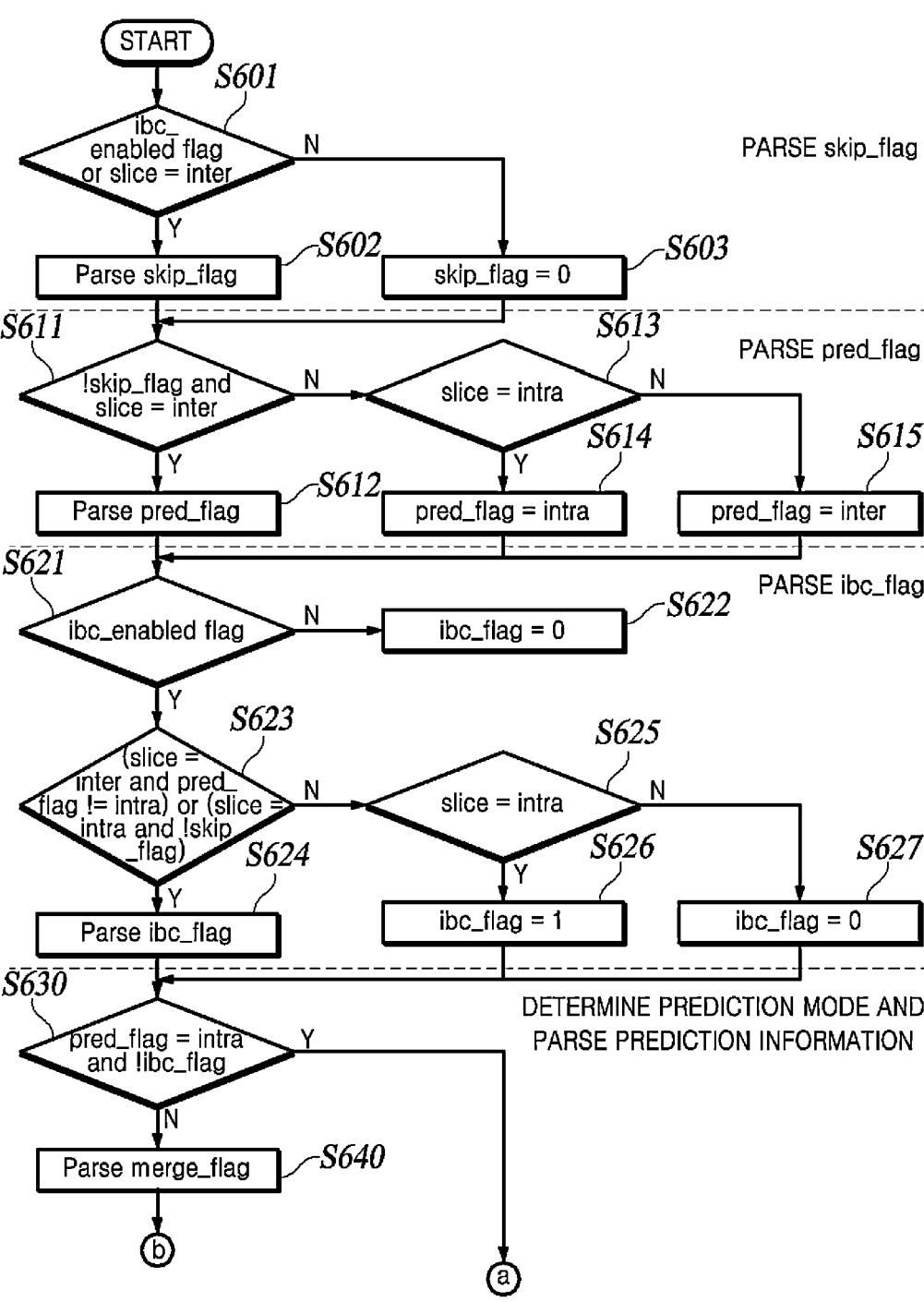
FIGS. 6A and 6B are a diagram for describing a process of determining a prediction mode of a current coding block by decoding syntax elements for the current coding block.
Figure 6B:
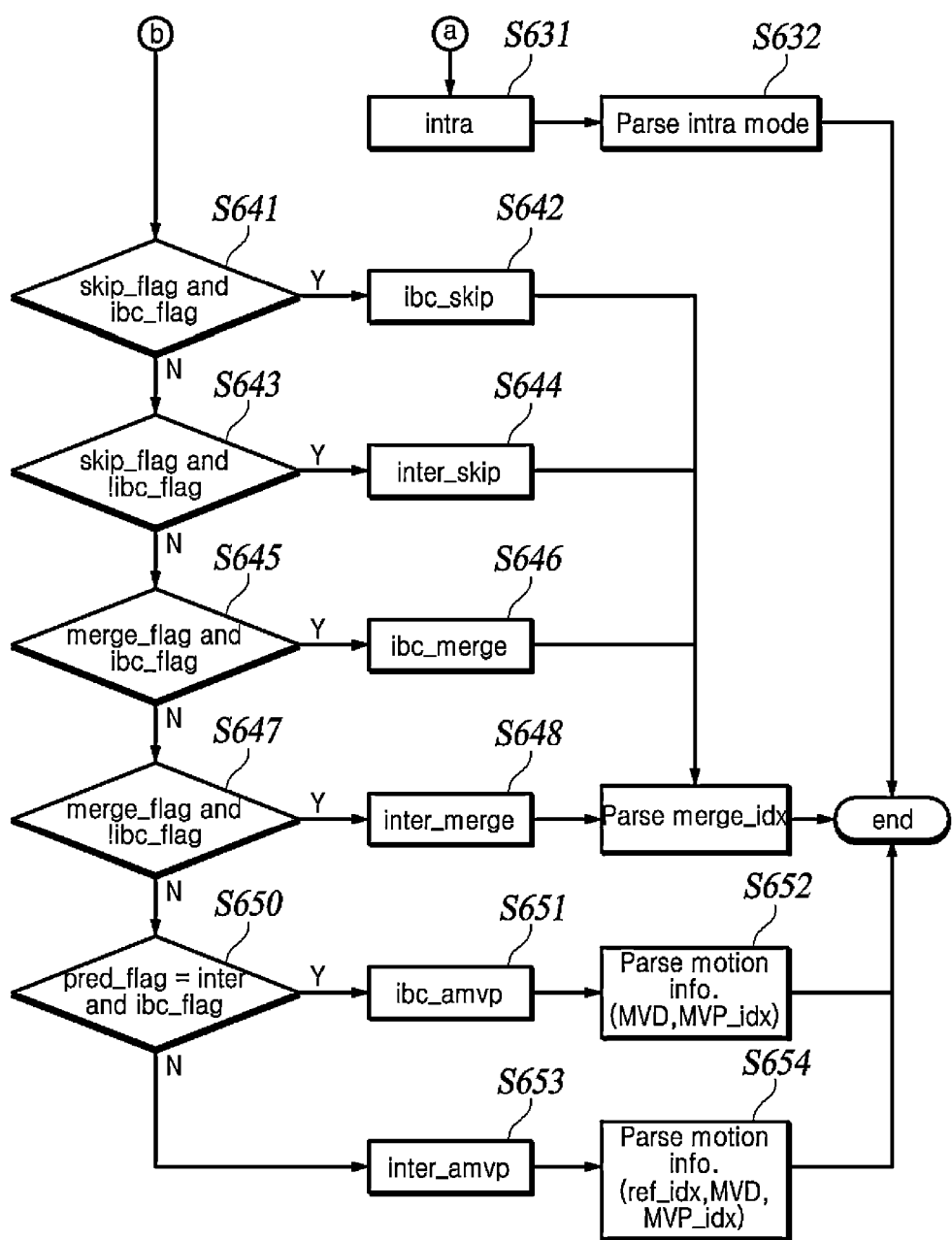

FIGS. 6A and 6B are a diagram for describing a process of determining a prediction mode of a current coding block by decoding syntax elements for the current coding block. Here, a method of decoding syntax elements will be described, but this method may also apply to a method of encoding syntax elements.

The IBC mode may be adaptively used, and whether the IBC mode will be turned on or off may be controlled through high-level syntax. For example, a flag ibc_enabled_flag indicating whether the IBC mode is enabled may be signaled in units of SPSs, PPSs, slices or coding tree block (CTU).

The process of FIGS. 6A and 6B may be divided into (1) a process of decoding skip_flag indicating whether the current coding block corresponds to the skip mode (S601 to S603), (2) a process of decoding prediction type information pred_flag indicating whether a mode of the current coding block is the inter prediction mode or the intra prediction mode (S611 to S615), (3) a process of decoding ibc_flag indicating whether the current coding block has been encoded in the IBC mode (S621 to S627), and (4) a process of determining a prediction mode of the current coding block using decoded syntaxes and decoding multiple pieces of prediction information of the current coding block according to the determined prediction mode (S630 to S654).

First, in the process (1), when ibc_enabled_flag is on (e.g., when ibc_enabled_flag=1) or when a slice type is not intra, the video decoding apparatus decodes skip_flag for the current coding block (S601 and S602). Otherwise, skip_flag is automatically set to 0 (S601 and S603). Here, when the slice type is intra, it means that the all blocks included in a corresponding slice have been encoded in the intra mode. That is, only the intra mode is available for all the blocks included in the slice. On the other hand, when the slice type is not intra, i.e., when the slice type is inter, it means that the inter prediction mode or the intra prediction mode is selectively applicable to the blocks included in the slice. That is, all modes are allowed for the blocks included in the slice without limit in a mode. The information about the slice type is signaled in a slice header. When skip_flag is 1, the prediction mode of the current coding block may be an inter_skip mode or an ibc_skip mode. Whether the prediction mode of the current coding block is the inter_skip or the ibc_skip mode may be determined by an ibc_flag value to be described below. When the ibc_flag value is "1", the prediction mode of the current coding block is the ibc_skip mode, and when the ibc_flag value is "0", the prediction mode of the current coding block is the inter_skip mode.

In the process (2), when skip_flag is off (skip_flag=0) and when the slice type is not intra (i.e., when the slice type is inter), the video decoding apparatus decodes pred_flag (S611 and S612). That is, all modes are allowed for the blocks included in the slice. Otherwise, whether the slice type is intra is checked. When the slice type is intra, all the blocks included in the slice have been encoded in the intra prediction mode, and thus the prediction mode of the current coding block is also set to the intra prediction mode. That is, pred_flag is automatically set to intra (S613 and S614). On the other hand, when the slice type is not intra, the prediction mode of the current block is set to inter. That is, pred_flag is automatically set to inter (S613 and S615). When pred_flag is intra, the prediction mode of the current coding block is set to the intra mode. Alternatively, when pred_flag is inter, the prediction mode of the current coding block may be determined as a general inter mode or the IBC mode according to ibc_flag to be described below.

In the process (3), when ibc_enabled_flag is off, ibc_flag is set to 0 (S621 and S622).

On the other hand, when ibc_enabled_flag is on, operation S623 is performed. ibc_flag is decoded when the slice type is not intra (i.e., when the slice type is inter) and a pred_flag value is inter (i.e., when the pred_flag value is not intra), or when the slice type is intra and skip_flag is 0 (S623 and S624). Otherwise, when the slice type is intra, ibc_flag is automatically set to 1 and when the slice type is not intra, ibc_flag is automatically set to 0.

In the process (4), when pred_flag is intra and ibc_flag-0, the video decoding apparatus sets the prediction mode of the current coding block to the intra mode and decodes information about an intra-prediction mode (S630, S631, and S632). Otherwise, the video decoding apparatus decodes merge flag (S630 and S640). The merge flag indicates whether motion information of the current coding block has been encoded in the merge mode. Although not shown in FIGS. 6A and 6B, the merge flag may be decoded from the bitstream only when skip_flag=0. If skip_flag=1, the merge flag is automatically set to 1.

Thereafter, a final mode of the current coding block is determined using skip_flag, merge_flag, pred_flag, and/or ibc_flag. In the case of skip_flag=1, the ibc_skip mode or the inter_skip mode is selected as the prediction mode of the current coding block according to ibc_flag (S641 to S644). In the case of skip_flag=0, an ibc_merge mode or an inter_merge is selected as the prediction mode of the current coding block according to ibc_flag when merge flag=1 (S645 to S648). When the prediction mode of the current coding block is determined as ibc_skip, inter_skip, ibc_merge or inter_merge, the video decoding apparatus decodes merge index (merge_idx) (S649), and a motion vector of a block indicated by a merge index among merge candidates derived from neighboring blocks is determined as a motion vector or a block vector of the current coding block.

When merge flag=0, the prediction mode of the current coding block is determined as ibc_amvp when pred_flag=inter and ibc_flag=1 (S650 and S651). Therefore, the video decoding apparatus determines the block vector of the current coding block by decoding a block vector difference (BVD) and a BVP index bvp_idx with respect to the current coding block (S652). The video decoding apparatus determines a BVP according to the BVP index bvp_idx and calculates the block vector of the current coding block by adding the BVP and the BVD. In addition, the video decoding apparatus uses a reference block, which is included in the current picture and indicated by the block vector, as the prediction block of the current coding block.

When the condition of operation S650 is not satisfied, the prediction mode of the current coding block is set to the inter_amvp mode (S653). Therefore, the video decoding apparatus decodes reference picture information ref_idx, the MVD, and the MVP index mvp_idx from the bitstream (S654) and calculates the motion vector of the current coding block by adding an MVP candidate indicated by the MVP index among MVP candidates and the MVD. In addition, a reference block indicated by the motion vector in a reference picture indicated by reference picture information is used as the prediction block of the current coding block.

When, in the IBC mode, a search area for searching for a reference block is set to an entire region that has been already encoded/decoded in the current picture, prediction may be more accurately performed, but the capacity of a memory, i.e., a buffer, for storing information about the search area should be increased to be proportional to a size of the search area. Therefore, it is necessary to appropriately set a size of the search area.

In the present disclosure, a search area used in the IBC mode is limited to a current coding tree block in which a target block (the current coding block) to be encoded or decoded is located, and a coding tree block adjacent to a left side of the current coding block. For example, two coding tree blocks (left and current coding tree blocks) may be set together as a virtual buffer space and a search area may be limited to a region stored in the virtual buffer space. More specifically, each coding tree block is partitioned into a plurality of processing regions which have the same size. In other words, the virtual buffer space is divided into a plurality of equal-sized processing regions. The search area is selected from among pre-encoded/pre-decoded processing regions in the virtual buffer space (including the current coding tree block and the left coding tree block). Here, the processing regions may be defined as block units, e.g., 64×64 blocks, for parallel processing. When a coding tree block has a size of 128×128, one coding tree block includes four 64×64 blocks, and parallel processing may be performed in units of 64×64 blocks. In this case, the virtual buffer space (including two coding tree blocks) may have a size of 256×128.

The IBC mode is a prediction method performed within the same screen and thus parallel processing may be one of main issues. That is, when the target block (the current coding block) is encoded, a reference block may be searched for only in encoded or decoded regions. Therefore, the search area may be set to n (n is a natural number) 64×64 blocks (processing regions) of the virtual buffer space that have been encoded or decoded prior to the current coding block in consideration of parallel processing.

The search area may be selected from the virtual buffer space on the basis of a position at which a current processing region, which includes the current coding block among a plurality of processing regions split from the current coding tree block, is located in the current coding tree bock. For example, all of processing regions that have been already encoded/decoded in the current coding tree block are set as the search area. In addition, the search area may be set from the left coding tree block, excluding a processing region that is co-located with the current processing region, from among a plurality of processing regions split from the left coding tree block. The search area may be set each time a first coding block included in each processing region is encoded or decoded. For example, when the current coding block is the first coding block which is to be encoded or decoded in the current processing region, a processing region in the left coding tree block which is co-located with the current processing region may be excluded from the search area. The excluded region is continuously not used as a search area for coding blocks to be decoded after the current coding block in the current coding tree block.

On the other hand, the search area may be selected among processing regions which have been encoded/decoded prior to the current processing region including the current coding block, according to an encoding/decoding order of the processing regions in the current coding tree block. For example, among processing regions that have been already encoded/decoded in the current coding tree block are selected a predetermined number n of processing regions of which encoding/decoding order is later. The predetermined number n may be set to m−1, for example, when the number of processing regions in the coding tree block is m, but embodiments are not limited thereto. When the number of the processing regions selectable in the current coding tree block is less than the predetermined number n, a shortfall is additionally selected from among processing regions in the left coding tree block.

For example, an encoding/decoding order may be used for selecting processing regions in the left coding tree block which are to be set as the search area. That is, processing regions that have been encoded/decoded at a later time may be set as the search area among processing regions in the left coding tree block. As another example, when the predetermined number n is set to m−1 (m denotes the number of processing regions of a coding tree block), the search area may be set from the left coding tree block, excluding a processing region in the left coding tree block which is co-located with the current processing region including the current coding block. The excluded region is not continuously used as a search area for coding blocks to be decoded after the current coding block in the current coding tree block.

As another method, the search area may be set to include all of pre-decoded processing regions among processing regions that are split from the current coding tree block, and a fixed number of processing regions which are located at predetermined positions among processing regions that are split from the left coding tree block.

As another method, the search area may further include a portion which has been already encoded/decoded in the current processing region including the current coding block.

When the search area is set as described above, a value of a block vector in the IBC mode should not be set as a value that indicates the outside of the search area. In other words, a restriction that all pixels included in a reference block indicated by the block vector should be within the search area should be satisfied.

Various embodiments in which the search area is set in the IBC mode will be described in detail with reference to FIGS. 7 to 13 below. For convenience of description, it is assumed that the coding tree blocks have a size of 128×128 and the processing regions have a size of 64×64.

First Embodiment

In the present embodiment, in a virtual buffer space, the search space is set to include n regions among 64×64 regions encoded and decoded immediately before a current 64×64 processing region including the current coding block to be encoded or decoded. Here, n may represent a natural number greater than or equal to 1. In the present embodiment, the n regions are based on an encoding/decoding order of 64×64 regions included in the current coding tree block and/or an encoding/decoding order of 64×64 regions included in the left coding tree block. The search area is set as n regions in an order reversed from the encoding/decoding order, starting from the most recently encoded/decoded 64×64 region with respect to the current processing region including the current coding block. For example, an encoding/decoding order between coding tree blocks is based on a raster scan order. That is, a left coding tree block is encoded or decoded earlier than a right coding tree block.

An encoding/decoding order of 64×64 regions included in a coding tree block may vary according to a split form in which the coding tree block is split in a tree structure.

Figure 7:
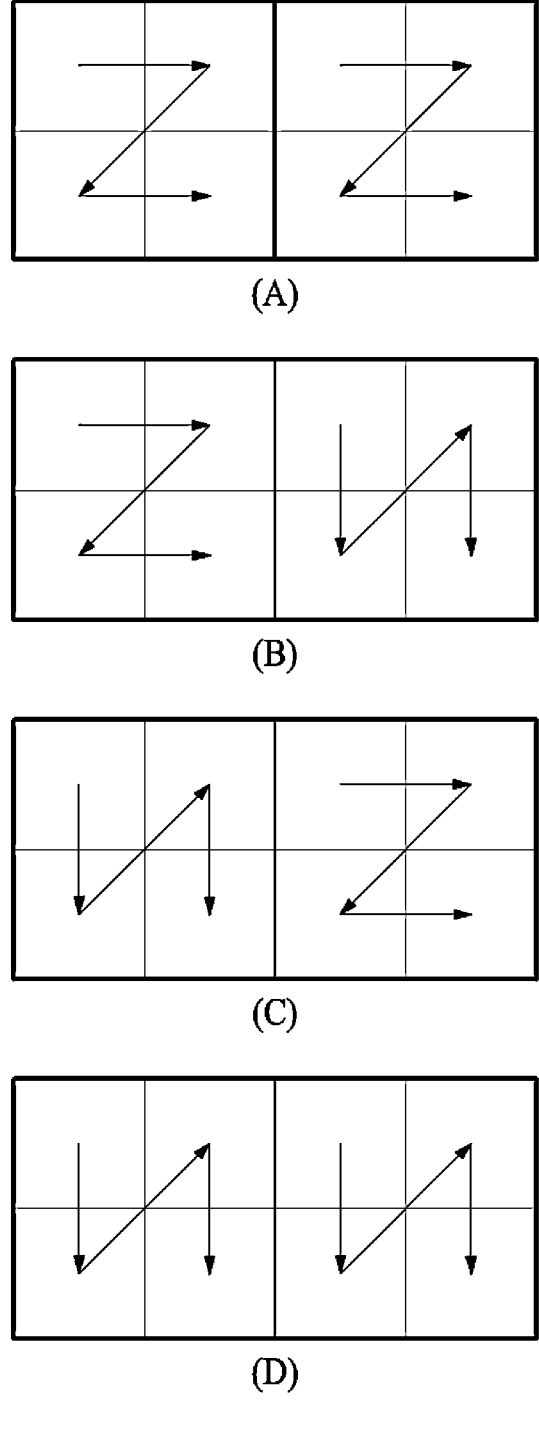
FIG. 7 is a diagram for describing an encoding/decoding order of a coding tree block according to a split form of the coding tree block.

FIG. 7 is a diagram for describing an encoding/decoding order of a coding tree block in a virtual buffer space according to a partition type of the coding tree block. In FIG. 7, each square refers to a 64×64 processing region, and a square region consisting of four 64×64 regions forms one coding tree block.

An order in which nodes are processed in a tree structure of the coding tree block is based on a depth first search method. When the coding tree block is split into a quad-tree (QT) structure or a horizontal binary structure, the four 64×64 regions of the coding tree block are encoded or decoded in the Z-scan order (i.e., an upper left region, an upper right region, a lower left region, and a lower right region). On the other hand, when the coding tree block is first split into a vertical binary structure, four 64×64 regions of the coding tree block are encoded or decoded in a reverse N-scan order (i.e., the upper left region, lower left region, the upper right region, and the lower right region).

Therefore, the encoding/decoding order of the current coding tree block and the left coding tree block may be classified into four cases according to the partition type of each coding tree block as shown in (A) to (D) of FIG. 7. (A) of FIG. 7 illustrates a case in which both the current coding tree block and the left coding tree block are split in the QT structure or the horizontal binary structure, (B) of FIG. 7 illustrates a case in which the current coding tree block is split in the vertical binary structure and the left coding tree block is split in the QT structure or the horizontal binary structure, (C) of FIG. 7 illustrates a case in which the current coding tree block is split in the QT structure or the horizontal binary structure and the left coding tree block is split in the vertical binary structure, and (D) of FIG. 7 illustrates a case in which both the current coding tree block and the left coding tree block are split in the vertical binary structure.

Figure 8:
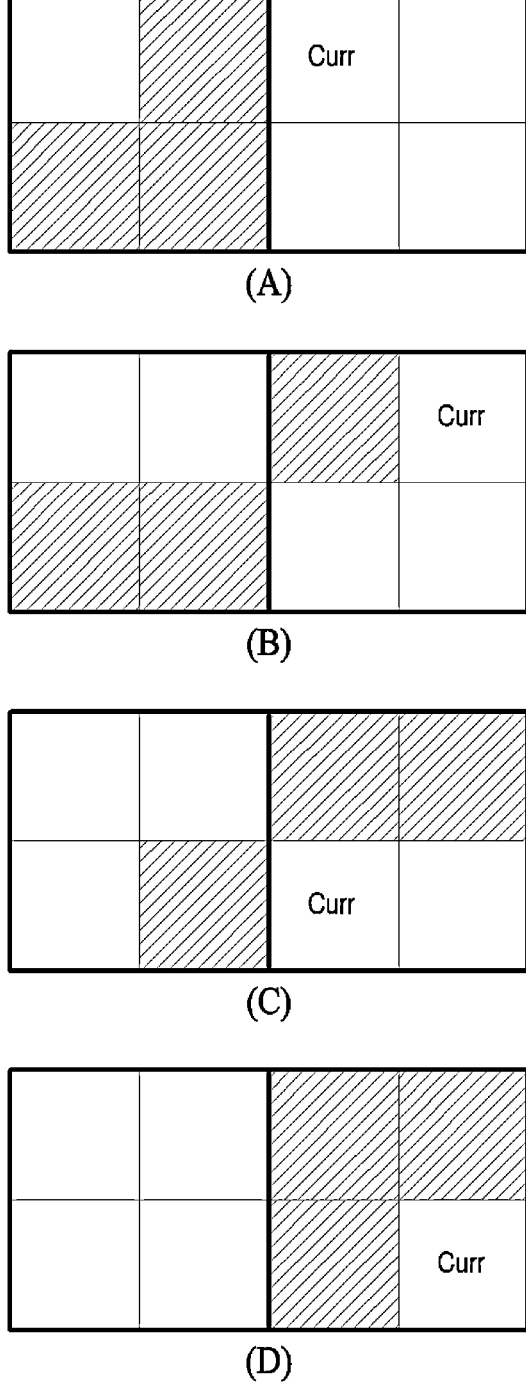
FIG. 8 is a diagram for describing a method of setting a search area according to a position of a current coding block when a scan order is as illustrated in (A) of FIG. 7.

FIG. 8 is a diagram for describing a method of setting the search area according to a position of the current coding block when a scan order is as illustrated in (A) of FIG. 7. In the example of FIG. 8, it is assumed that the number of 64×64 regions used as a search area is three. "Curr" represents a 64×64 region including the current coding block to be encoded or decoded and hatched regions represent the search area.

As shown in (A) of FIG. 8, when the current coding block is located in a 64×64 upper left region of the current coding tree block, the current coding tree block does not include any 64×64 region that has been encoded/decoded. Therefore, a 64×64 upper right region, a 64×64 lower left region, and a 64×64 lower right region of a left coding tree block are set as the search area for the current coding block according to the Z-scan order.

As shown in (B) of FIG. 8, when the current coding block is located in a 64×64 upper right region of the current coding tree block, a 64×64 upper left region in the current coding tree block is first set as the search area in an encoding/decoding order. Thereafter, a 64×64 lower left region and a 64×64 lower right region in the left coding tree block are set as the search area.

When the current coding block is located in a 64×64 lower left region in the current coding tree block, the 64×64 upper left region and the 64×64 upper right region in the current coding tree block are set as the search area as illustrated in (C) of FIG. 8. Thereafter, the 64×64 lower right region which has been encoded or decoded last among the 64×64 regions in the left coding tree block is set as the search area.

When the current coding block is located in a 64×64 lower right region in the current coding tree block, three regions, i.e., the 64×64 upper left and upper right regions and the 64×64 lower left region, in the current coding tree block have been already encoded or decoded, and thus may be set as the search area. Thus, no region in the left coding tree block is set as the search area.

The example of FIG. 8 may be described as setting the search area on the basis of a position of a 64×64 region including the current coding block. First, all of 64×64 regions that have been already encoded/decoded in the current coding tree block are set as the search area. A region which is located at the same position as the 64×64 region including the current coding block among 64×64 regions of the left coding tree block is excluded from the search area for the current coding block and is not used as a search area for coding blocks in the current coding tree block which are to be encoded or decoded after the current coding block.

When coding blocks which are located in the 64×64 upper left region of the current coding tree block are encoded or decoded, the 64×64 upper left region in the left coding tree block is excluded from the search area. The current coding tree block does not include any 64×64 region that has been already encoded/decoded. Thus, as shown in (A) of FIG. 8, the 64×64 upper right region, lower left and lower right regions in the left coding tree block are set as the search area for the current coding block.

Next, when coding blocks which are located in the 64×64 upper right region in the current coding tree block are encoded or decoded, the 64×64 upper right region of the left coding tree block is excluded from the search area. In addition, the 64×64 upper left region of the left coding tree block has already been excluded from the search area. Thus, as shown in (B) of FIG. 8, the search area is set to include the 64×64 upper left region of the current coding tree block which has been encoded or decoded, and the 64×64 lower left and lower right regions of the left coding tree block.

Next, when the current coding block is located in the 64×64 lower left region of the current coding tree block, the 64×64 lower left region of the left coding tree block is excluded from the search area. In addition, the 64×64 upper left and upper right regions of the left coding tree block have already been excluded and thus are not set as the search area. Thus, as shown in (C) of FIG. 8, the 64×64 upper left and upper right regions of the current coding tree block which have already been encoded or decoded and the 64×64 lower right region of the left coding tree block are set as the search area.

Finally, when coding blocks which are located in the 64×64 lower right region of the current coding tree block are encoded or decoded, the 64×64 lower right region of the left coding tree block is excluded from the search area. The 64×64 upper left, upper right and lower left regions of the left coding tree block have already been excluded from the search area, and thus the 64×64 upper left, upper right and lower left regions of the current coding tree block, which have already been encoded or decoded, are set as the search area as shown in (C) of FIG. 8.

Figure 9:
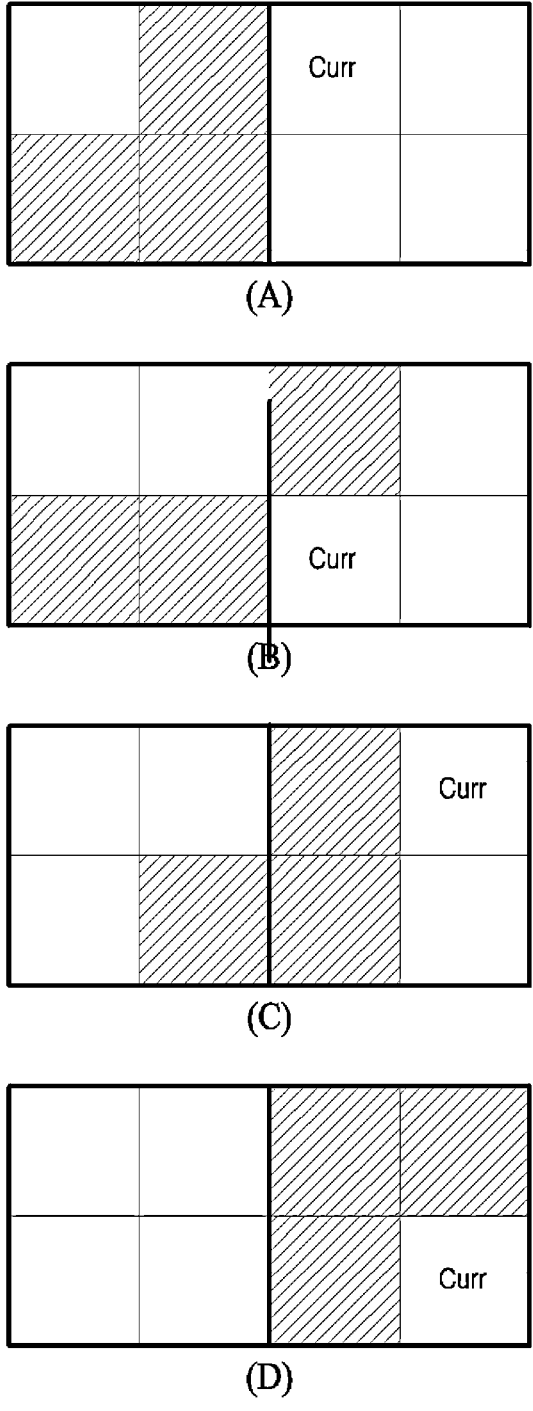
FIG. 9 is a diagram for describing a method of setting a search area according to a position of a current coding block when a scan order is as illustrated in (B) of FIG. 7.

As another example, when a scan order is as shown in (B) of FIG. 7, a search area according to a position of a current coding block is as shown in FIG. 9.

Although it is assumed in FIGS. 8 and 9 that the number n of 64×64 regions used as a search area is three, n may be set to a value, e.g., 2, other than 3, and in this case, the same principle described above may also apply.

Second Embodiment

In the present embodiment, the search area is set to include a fixed number of 64×64 regions in the left coding tree block, and 64×64 regions that have been already encoded or decoded in the current coding tree block.

Figure 10:
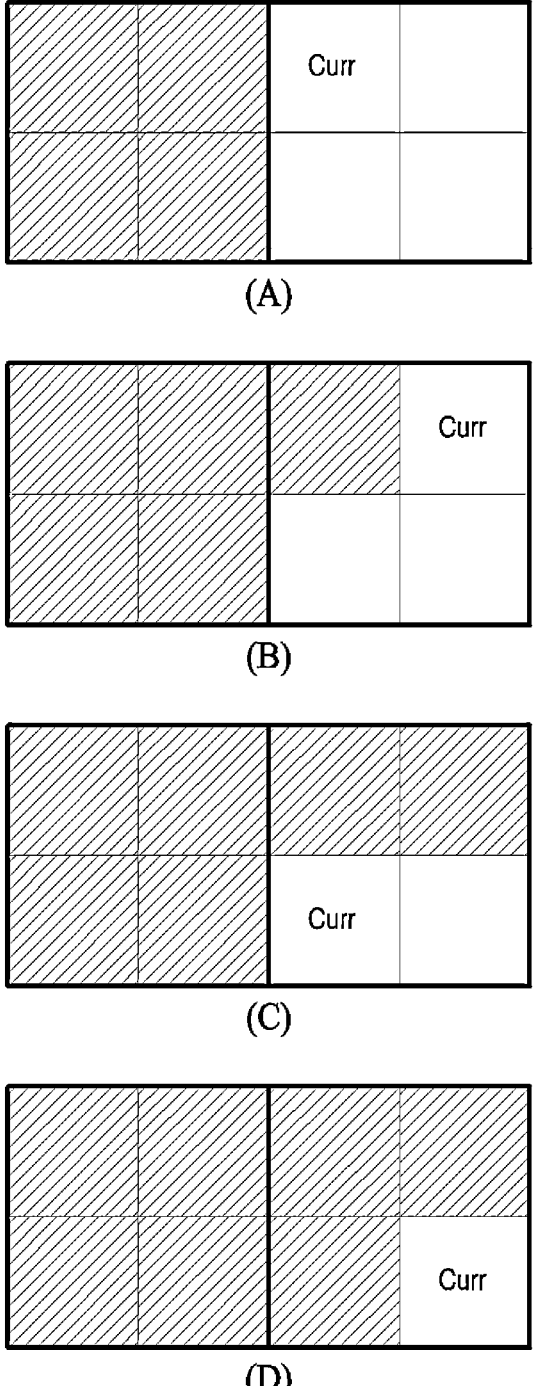
FIG. 10 is a diagram for describing an example of a method of setting a search area when 64×64 regions of a current coding tree block are encoded/decoded in a Z-scan order.

FIG. 10 is a diagram for describing an exemplary method of setting the search area when 64×64 regions of the current coding tree block are encoded/decoded in a Z-scan order.

In the present example, four 64×64 regions, i.e., all of the 64×64 regions, of the left coding tree block are set as the search area.

In the current coding tree block, 64×64 regions are sequentially set as the search area according to the Z-scan order in which they are encoded/decoded. According to the Z-scan order, coding blocks located in the upper left region are first encoded or decoded. In this case, the current coding tree block does not include any 64×64 region that has been encoded/decoded. Therefore, the search area is not set in the current coding tree block ((A) of FIG. 10). Next, when coding blocks located in the upper right region are encoded/decoded, the 64×64 upper left region has already been encoded/decoded and thus is set as the search area ((B) of FIG. 10). As described above, previously encoded/decoded 64×64 regions in the current coding tree block are set as the search area. When coding blocks of the 64×64 lower left region are encoded/decoded, the search area is as shown in (C) of FIG. 10, and when coding blocks of the 64×64 lower right region are encoded/decoded, the search area is as shown in (D) of FIG. 10.

Figure 11:
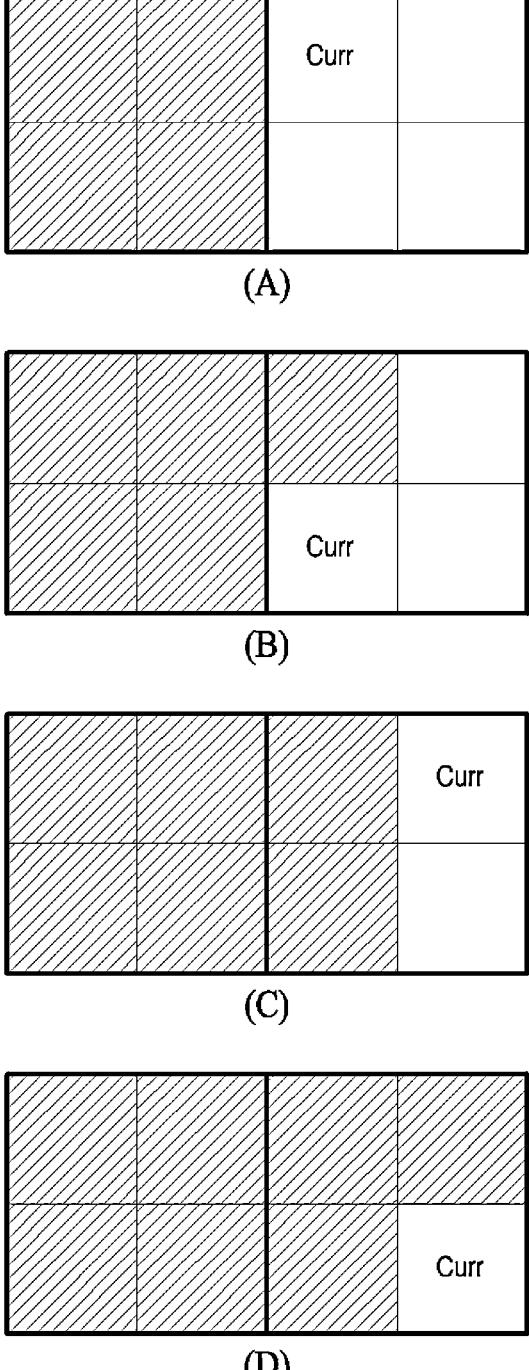
FIG. 11 is a diagram for describing another example of a method of setting a search area when 64×64 regions of a current coding tree block are encoded/decoded in a reverse N-scan order.

FIG. 11 is a diagram for describing another exemplary method of setting the search area when 64×64 regions of the current coding tree block are encoded/decoded in a reverse N-scan order.

When encoding/decoding is performed in the reverse N-scan order, i.e., an order of a 64×64 upper left region, a 64×64 lower left region, a 64×64 upper right region, and a 64×64 lower right region, the search area is set as shown in (A) to (D) of FIG. 11.

Figure 12:
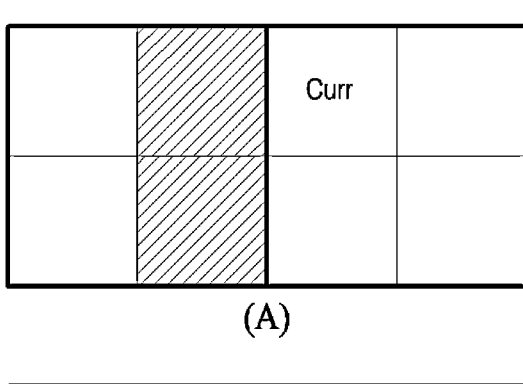
FIG. 12 is a diagram for describing another example of a method of setting a search area within a left coding tree block.
Figure 12:
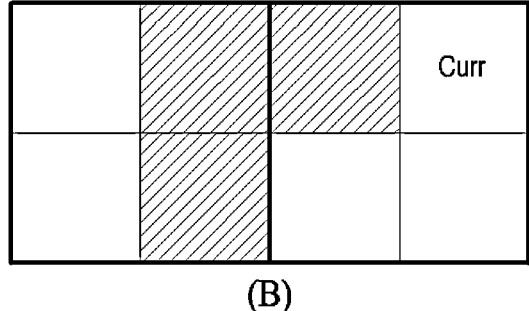
Figure 12:
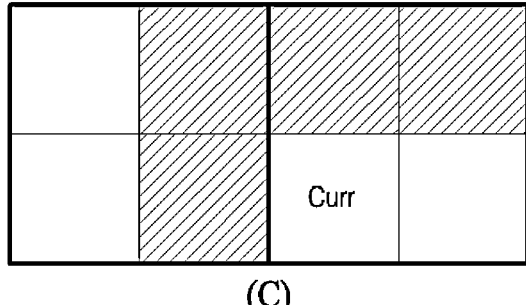
Figure 12:
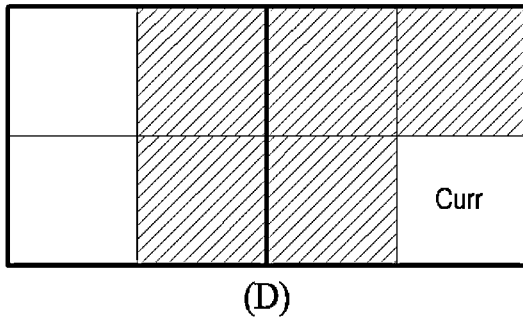

Although it is described above that all of four 64×64 regions of the left coding tree block are set as 소 트 search area, the present disclosure is not limited thereto and only some of four 64×64 regions may be set as the search area. For example, only two or three regions that are encoded/decoded recently among 64×64 regions in the left coding tree block may be set as the search area or only regions located at fixed positions, e.g., only the upper right region and the lower right region of the left coding tree block as shown in FIG. 12, may be set as a search area.

In the embodiments described above, only 64×64 regions that have been already encoded/decoded in the current and left coding tree blocks are set as the search area in the virtual buffer space. However, as shown in FIG. 13, in addition to the already encoded/decoded 64×64 regions, the search area may include a portion which has been already encoded/decoded in a 64×64 region including the current coding block to be encoded/decoded.

Figure 13:
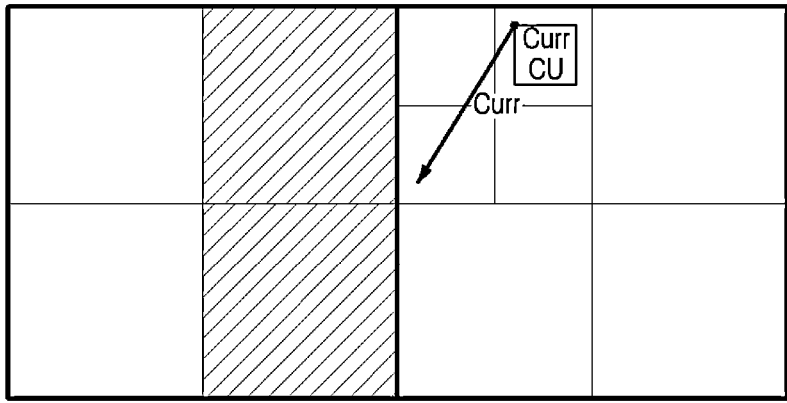
FIG. 13 is a diagram for describing another example of setting, as a search area, a predetermined number of 64×64 regions of a left coding tree block and encoded/decoded regions of a current coding tree block.

FIG. 13 is a diagram for describing another example of setting, as the search area, a predetermined number of 64×64 regions in the left coding tree block and the portion that has been already encoded/decoded in the current coding tree block.

In the example of FIG. 13, the 64×64 upper right and lower right regions of the left coding tree block are set as the search area. In addition, the search area may be set to include not only a 64×64 region which has been already encoded/decoded in the current coding tree block but also a portion which has been already encoded/decoded in a 64×64 region including the current coding block to be encoded or decoded. For example, when it is assumed that the current coding block is located in a 32×32 upper right region of the 64×64 upper left region, a 32×32 upper left region has already been encoded/decoded and thus may be set as the search area. In addition, a 32×32 lower right region is always encoded/decoded later than the 32×32 upper right region and thus cannot be set as the search area.

Whether a 32×32 lower left region is to be set as a search area is determined according to the encoding/decoding order. When the four 32×32 regions are encoded/decoded in the reverse N-scan order, the 32×32 lower left region is encoded/decoded earlier than the 32×32 upper left region. Thus, the 32×32 lower left region may also be set as the search area. That is, a block vector of the current coding block may indicate the 32×32 lower left region. In contrast, when the four 32×32 regions are encoded/decoded in the Z-scan order, the 32×32 lower left region cannot be set as the search area.

Various examples for setting the search area for the current coding block in the IBC mode have been described above, the search area may be set by a shared method that is predefined between the video encoding apparatus and the video decoding apparatus. Alternatively, the search area may be adaptively set by the video encoding apparatus and information about the search area may be signaled to the video decoding apparatus. The information about the search area may be included in header information, e.g., a sequence parameter set, a picture parameter set, a slice header, or a coding tree block (CTU) header. The information about the search area may be signaled only when the flag ibc_enabled_flag for turning the IBC mode on/off is on.

In the IBC mode, a block vector is a value indicating a displacement from the current coding block to a reference block included in the search area and is generally defined as a vector from an upper left sample included in the current coding block to an upper left sample included in the reference block. In the present disclosure, another method of encoding/decoding the block vector of the current coding block will be described.

Figure 14:
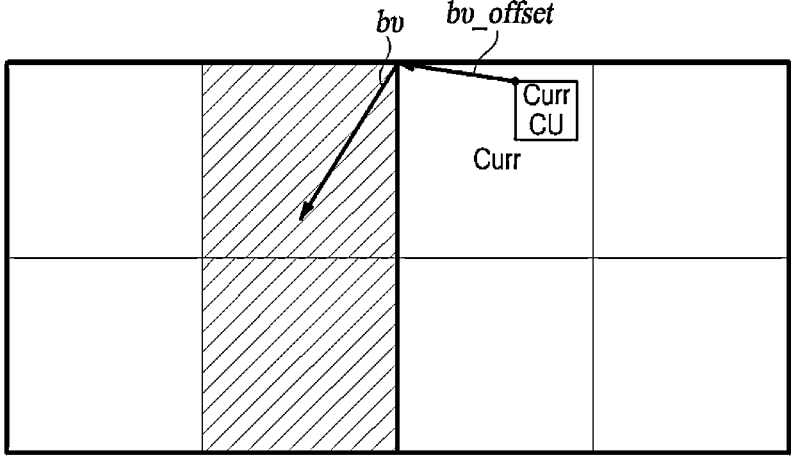
FIG. 14 is a diagram for describing a method of encoding/decoding a block vector.

FIG. 14 is a diagram for describing another method of encoding/decoding a block vector.

In the present example, the block vector may be set as a displacement from an upper left sample included in a processing region (e.g., a 64×64 region) which includes the current coding block, rather than the current coding block.

A block vector signaled from the video encoding apparatus is a displacement ("bv" in FIG. 14) to a reference block from the upper left sample in the 64×64 region including the current coding block. As described above, information about the block vector is signaled as a merge index in the skip mode or the merge mode and is signaled as a BVD and a BVP index in the AMVP mode.

The video decoding apparatus may reconstruct a block vector from the information about the block vector, and set, as a prediction block of a current coding block, a reference block located at a position indicated by the block vector from an upper left sample in the 64×64 region in which the current coding block is located. Alternatively, the video decoding apparatus may compensate for the block vector by adding the block vector and an offset vector ("bv_offset" in FIG. 14) from the current coding block to the upper left sample in the 64×64 region in which the current coding block is located. The video decoding apparatus may generate, as a prediction block, a reference block located at a position indicated by the compensated block vector from the current coding block. In the skip mode or the merge mode, a block vector may be compensated for according to Equation 1 below, and in the AMVP mode, a block vector may be compensated for according to Equation 2 below.

$$bv[0] = mergeList[\text{merge\_idx}][0] + \text{bv\_offset}[0] \qquad [\text{Equation 1}]$$

$$bv[1] = mergeList[\text{merge\_idx}][1] + \text{bv\_offset}[1]$$

mergeList represents merge candidates derived from motion vectors of neighboring blocks, and merge_idx represents a merge index indicating a candidate used as a block vector of the current coding block among the merge candidates.

$$bv[0] = bvd[0] + bvp[0] + bv\_offset[0] \qquad \text{[Equation 2]}$$

$$bv[1] = bvd[1] + bvp[1] + bv\_offset[1]$$

bvd and bvp represent a BVD and a BVP, respectively. In Equations 1 and 2, [0] represents a value of an x component and [1] represents a value of a y component.

In the IBC mode, the reference block indicated by the block vector should be located within the search area. Encoding and decoding cannot be performed normally when the reference block is not located within the search area.

Therefore, the block vector of the current coding block is clipped to ensure that the reference block is located within the defined search area. That is, when the block vector of the current coding block is located outside the defined search area, a clipping process is performed to compensate for the block vector so that the block vector may be located within the search area. The clipping process may be performed in the same way by the video encoding apparatus and the video decoding apparatus to fix a mismatch that may occur in an encoding or decoding process.

Figure 15:
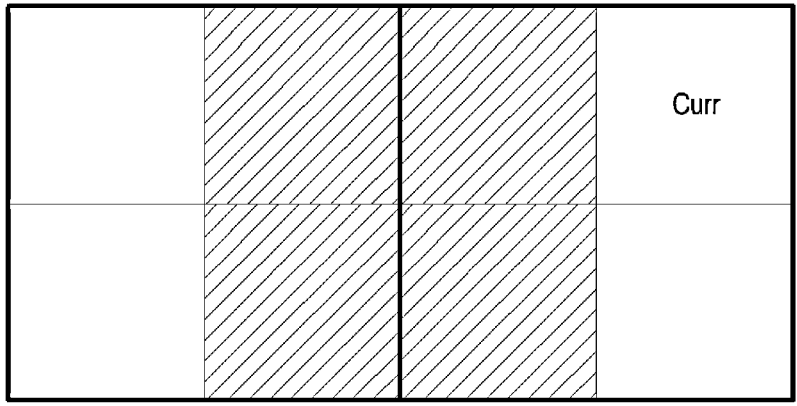
FIGS. 15 to 17 are diagrams for describing examples of a method of clipping a block vector.

For example, a clipping function for motion compensation is as shown in Equation 3 below when a search area is set as, for example, a hatched portion of FIG. 15. Equation 3 is only an example, and the present disclosure includes all expressions/calculation formula for modifying ibc motion information of a target block to be within a search range.

$$bv[0] = \text{clipping}(minBound[0], bv[0], maxBound[0]) \qquad \text{[Equation 3]}$$

$$bv[1] = \text{clipping}(minBound[1], bv[1], maxBound[1])$$

Here, minBound[0]=currCTU[0]-64, maxBound[0]=currCTU[0]+64, minBound[1]=currCTU[1], and maxBound[1]=currCTU[1]+128. currCTU[0] represents an x-axis position of the current coding tree block and currCTU[1] represents a y-axis position of the current coding tree block. Referring to FIG. 15, minBound[0] is a left boundary of the hatched region, maxBound[0] is a right boundary of the hatched region, minBound[1] is an upper boundary of the hatched region, and maxBound[1] is a lower boundary of the hatched region.

Figure 16:
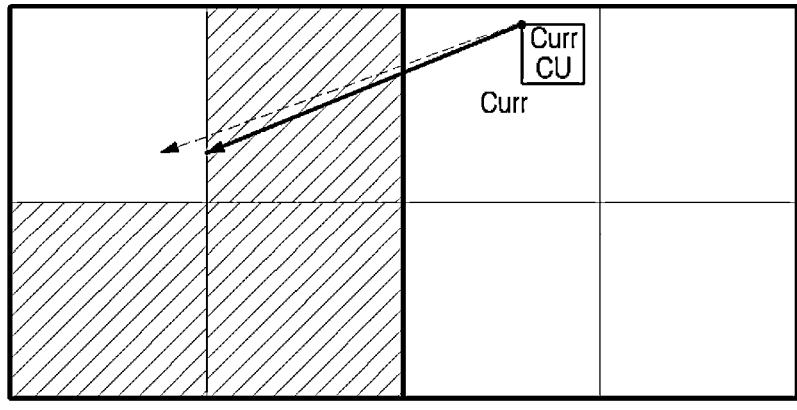
Figure 16:
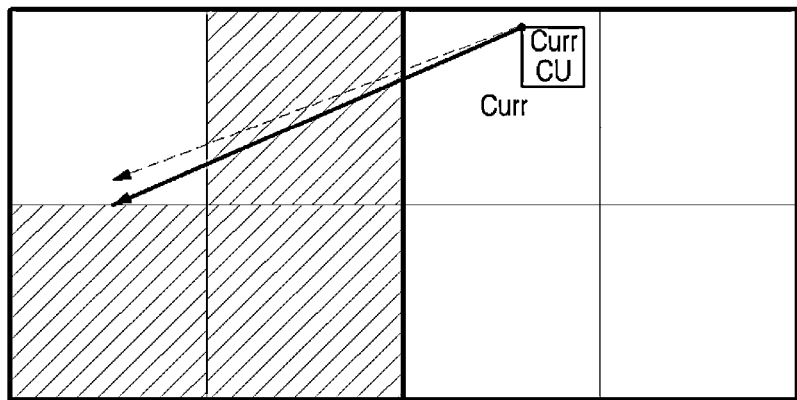

As another example, when the block vector of the current coding block is located outside the search area, the block vector is compensated for to indicate a position of a sample among samples on an x-axis boundary and a y-axis boundary which is closest to a position indicated by an original block vector. In FIG. 16, a dotted line represents the original block vector and a solid line represents the compensated block vector. As shown in (A) of FIG. 16, an x component of the original block vector is compensated for when the original block vector is located closer to an x-axis boundary line among the x-axis boundary line and a y-axis boundary line, and a y component of the original block vector is compensated for when the original block vector is located closer to the y-axis boundary line. This may be expressed by Equation 4 below.

$$\text{if } bv \text{ is closer to boundary}(x) \qquad \text{[Equation 4]}$$
$$\text{adjust } bv[0] \text{ to boundary}(x)$$
$$\text{else } // \text{ closer to boundary}(y)$$
$$\text{adjust by}[1] \text{ to boundary}(y)$$

Figure 17:
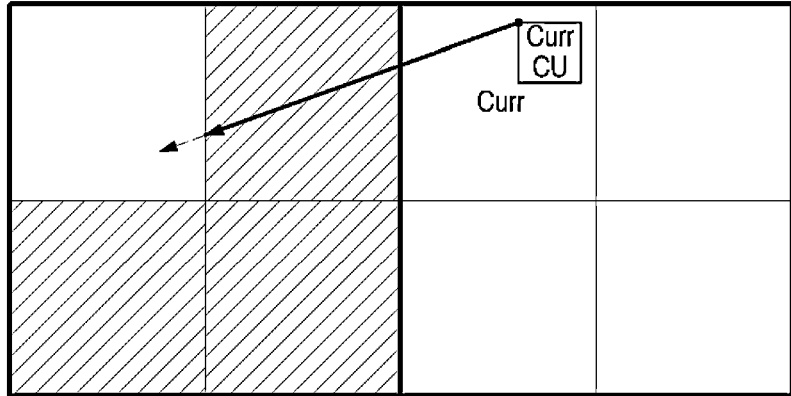

As another example, a compensation method for scaling an original block vector may be applied. In FIG. 17, a dotted line represents an original block vector of the current coding block and a solid line represents a compensated block vector. The block vector is compensated for to indicate an intersection of the line representing the original block vector and a boundary line of the search area.

Although only unidirectional IBC prediction has been described above, bi-prediction is also applicable to the IBC mode, similar to bi-prediction of inter prediction. In the AMVP mode, the video encoding apparatus may signal a flag representing whether a prediction direction is a uni-direction or a bi-direction, and two BVP indexes for bi-prediction when the flag represents the bi-direction, and two BVDs. In information about the two block vectors, a current picture including a current coding block may be used as a reference picture, or a previously encoded/decoded picture may be used as a reference picture. When previously encoded/decoded picture is used as a reference picture, a video encoding apparatus explicitly transmits information about the reference picture to the video decoding apparatus.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A video decoding method of predicting a picture, which is split into equal-sized coding tree blocks, in units of blocks, the video decoding method comprising:

reconstructing a block vector for a current coding block in a current coding tree block to be decoded, by decoding block vector information from a bitstream, wherein the current coding block is one of blocks split from the current coding tree block in a tree structure;

setting, as a prediction block of the current coding block, a reference block indicated by the block vector in the picture in which the current coding block is located; and reconstructing the current block based on the prediction block, wherein a value of the block vector is limited to prevent the reference block from being located outside a search area that is set in at least one of the current coding tree block and a left coding tree block of the current coding tree block, and the search area is selected from pre-decoded processing regions among a plurality of processing regions which are split in an equal size from each of the current coding tree block and the left coding tree block, and wherein a processing region of a plurality of processing regions in the left coding tree block, which is co-located with a current processing region containing the current coding block within the current coding tree block, is not set as the search area for the current coding block and a coding block which is included in the current coding tree block and is to be decoded after the current coding block.

2. The video decoding method of claim 1, wherein the coding tree blocks have a size of 128×128, and the processing regions have a size of 64×64.

3. The video decoding method of claim 1, wherein the search area is selected on the basis of a position at which the current processing region is located in the current coding tree block.

4. The video decoding method of claim 1, wherein the search area further includes a pre-decoded portion in a current processing region including the current coding block.

5. The video decoding method of claim 1, wherein the search area is selected from among the plurality of processing regions which are split in the equal size from each of the current coding tree block and the left coding tree block, by a predetermined number starting from a processing region that has been most recently decoded in a decoding order.

6. The video decoding method of claim 1, wherein the reconstructing of the block vector comprises:

generating an intermediate block vector using the block vector information; and compensating for the block vector by adding, to the intermediate block vector, a vector from an upper left sample included in the current coding block to an upper left sample included in a current processing region which includes the current coding block.

7. The video decoding method of claim 1, wherein, when the block vector is located outside the search area, a clipping operation is performed to modify the block vector to indicate a boundary of the search area.

8. The video decoding method of claim 7, wherein the clipping operation is performed to modify the block vector to indicate a sample closest to a sample indicated by the block vector among samples on the boundary of the search area.

9. The video decoding method of claim 7, wherein the clipping operation is performed to scale the block vector to indicate a sample on the boundary of the search area.

10. A video encoding method of predicting a picture, which is split into equal-sized coding tree blocks, in units of blocks, the video encoding method comprising:

determining a block vector of a current coding block of a current coding tree block to be encoded, wherein the current coding block is one of blocks split in a tree structure from the current coding tree block;

setting, as a prediction block of the current coding block, a reference block indicated by the block vector in the picture in which the current coding block is located;

encoding information about the block vector; and generating a residual block based on the prediction block and encoding the residual block, wherein a value of the block vector is limited to prevent the reference block from being located outside a search area that is set in at least one of the current coding tree block and a left coding tree block of the current coding tree block, and the search area is selected from among pre-encoded processing regions among a plurality of processing regions which are split in an equal size from each of the current coding tree block and the left coding tree block, and wherein a processing region of a plurality of processing regions in the left coding tree block, which is co-located with a current processing region containing the current coding block within the current coding tree block, is not set as the search area for the current coding block and a coding block which is to be subsequently encoded in the current coding tree block.

11. The video encoding method of claim 10, wherein the coding tree blocks have a size of 128×128, and the processing regions have a size of 64×64.

12. The video encoding method of claim 10, wherein the search area is selected on the basis of a position at which the current processing region is located in the current coding tree block.

13. The video encoding method of claim 10, wherein the search area further comprises a pre-encoded portion in a current processing region including the current coding block.

14. The video encoding method of claim 10, wherein the search area is selected from among the plurality of processing regions which are split in the equal size from each of the current coding tree block and the left coding tree block, by a predetermined number starting from a processing region which has been most recently encoded in an encoding order.

15. A method for providing a video decoding device with video data, the method comprising:

encoding the video data into a bitstream; and transmitting the bitstream to the video decoding device, wherein the encoding of the video data includes determining a block vector of a current coding block of a current coding tree block to be encoded, wherein the current coding block is one of blocks split in a tree structure from the current coding tree block;

setting, as a prediction block of the current coding block, a reference block indicated by the block vector in the picture in which the current coding block is located;

encoding information about the block vector; and generating a residual block based on the prediction block and encoding the residual block, wherein a value of the block vector is limited to prevent the reference block from being located outside a search area that is set in at least one of the current coding tree block and a left coding tree block of the current coding tree block, and the search area is selected from among pre-encoded processing regions among a plurality of processing regions which are split in an equal size from each of the current coding tree block and the left coding tree block, and wherein a processing region of a plurality of processing regions in the left coding tree block, which is co-located with a current processing region containing the current coding block within the current coding tree block, is not set as the search area for the current coding block and a coding block which is to be subsequently encoded in the current coding tree block.

* * * * *